United States Patent [19]

Ariyoshi et al.

[11] 3,976,824

[45] Aug. 24, 1976

[54] TREATING AGENT USEFUL FOR FIBROUS MATERIALS AND PREPARATION THEREOF

[75] Inventors: Junji Ariyoshi, Hirakata; Akira Ohnishi, Ashiya; Hiromi Toda, Daito; Kametaro Kunimori, Neyagawa; Mitsuyoshi Nakao, Kawachinagano, all of Japan

[73] Assignee: Arakawa Rinsan Kagaku Kogyo Kabushiki Kaisha, Osaka, Japan

[22] Filed: June 3, 1975

[21] Appl. No.: 583,262

[30] Foreign Application Priority Data
June 5, 1974 Japan.............................. 49-64444

[52] U.S. Cl................................. 526/23; 8/115.5; 162/166; 162/168 NA; 526/46; 526/49
[51] Int. Cl.²...................... C08F 8/30; C08F 8/08; D06M 15/12
[58] Field of Search............ 260/80.73, 80.3 N; 8/115.5; 162/166, 168

[56] References Cited
UNITED STATES PATENTS

| | | | |
|---|---|---|---|
| 3,507,847 | 4/1970 | Williams et al. | 260/89.7 |
| 3,840,489 | 10/1974 | Strazdins | 260/29.6 TA |
| 3,840,504 | 10/1974 | Keim | 260/79.3 A |

FOREIGN PATENTS OR APPLICATIONS 18,401    4/1966    Japan

*Primary Examiner*—John Kight, III
*Attorney, Agent, or Firm*—Armstrong, Nikaido & Wegner

[57] ABSTRACT

Amide-containing cationic copolymer is reacted with polyalkyleneimine in an aqueous medium to form a water-soluble cationic resin which is a treating agent useful for fibrous materials. The adduct of halohydrin to water-soluble cationic resin is a water-soluble cationic thermosetting resin and is also useful for treating fibrous materials. The treating agent has excellent retention ability to fiber, drainage property and storage stability and remarkably improves the retention of fillers and wet and dry strength of paper.

20 Claims, No Drawings

TREATING AGENT USEFUL FOR FIBROUS MATERIALS AND PREPARATION THEREOF

BACKGROUND OF THE INVENTION

The present invention relates to a novel treating agent for paper and fiber and a process for preparing the same, and more particularly to a treating agent mainly composed of a water-soluble cationic resin available for various fibers such as vegetable fibers, mineral fibers or synthetic fibers, and products therefrom such as papers, non-woven fabrics and fiberboards. Especially, the treating agent of the invention is suitably employing in paper making.

Hitherto, anionic acrylamide polymers have been widely employed as a treating agent in paper making. However, such polymers require a retention aid such as aluminum sulfate and the use thereof is limited to acidic pH range. Therefore, they have defects such as waste water problem, corrosion of paper machine and deterioration of paper.

There have also been proposed various cationic treating agents not requiring a retention aid such as aluminum sulfate.

U.S. Pat. No. 2,926,116 discloses a polyamide-polyamine resin. Such a resin improves dry and wet strengths of paper. However, the foaming tends to occur in sheet forming, and also the drainage and the retention effect for fillers and inferior.

It is known that polyethyleneimine, which is highly cationic, is employed as a wet strength agent, and the application thereof to paper making or the derivative thereof has been reported. Japanese Patent Publication No. 18401/1966 discloses polyethyleneimine-partially hydrolyzed polyacrylamide complex indicating ampho-teric polyelectrolyte, which is prepared by adding an aqueous solution of polyethyleneimine to an aqueous solution of partially hydrolyzed polyacrylamide and employed in a form of aqueous solution as a wet and dry strength agent. However, the improvement of wet and dry strengths of paper, the drainage and the retention effect for fillers are not necessarily sufficient. Also, polyethyleneimine-epichlorohydrin strength agent as shown in Japanese Patent Publication No. 14165/1968 improves wet strength, but has disadvantages that the drainage in sheet forming and the retention effect for fillers are poor and the formed sheet is noticeably colored. Further, there has been proposed a treating agent composed of a copolymer of acrylamide and a cationic monomer which is cationic by itself. However, a copolymer of acrylamide and 2-dimethylaminoethyl methacrylate as shown in U.S. Pat. No. 2,838,397 is also poor in the improvement of wet and dry strengths of paper.

Furthermore, there has been known from U.S. Pat. No. 3,507,847 a water-soluble cationic vinyl polymer useful as a wet strength agent in paper making, which is prepared by reacting polyacrylamide with di- or polyamines having at most six amino groups so as to introduce cationic groups to polyacrylamide by deammonification condensation. This cationic polymer can improve wet strength of paper, but the use thereof is limited to a narrow pH range around neutrality and also it is not practical in point of dry strength, retention effect for fillers and drainage. The above U.S. Patent also discloses a strength agent obtained by further subjecting the polyacrylamide-di- or poly-amine reaction product to addition reaction with epichlorohydrin. Epichlorohydrin has the effect of further improving wet strengthening property of the polyacrylamide-di- or polyamine reaction product to some extent and also has the effect of extending the pH range from neutrality to an alkaline range. However, such a strength agent still possesses the above-mentioned disadvantages and is not a satisfactory strength agent.

The present inventors, as a result of studying treating agents for paper or fiber on the basis of the fact that noncationic amide-containing polymers possess an excellent flocculating property and a strengthening property for paper or fiber, and polyalkyleneimines possess an flocculating property and a strengthening property for paper or fiber, particularly an excellent retention ability to fiber, had found that an water-soluble cationic amide-containing resin which was prepared by subjecting an amide-containing polymer to deammonification condensation with polyalkyleneimine, or a water-soluble cationic thermosetting resin obtained by reacting the amide-containing polymer, the polyalkyleneimine and a halohydrin, had excellent effects in treating paper and fiber (see U.S. Patent Application Ser. No. 555,039).

OBJECTS OF THE INVENTION

It is an object of the present invention to provide a novel treating agent useful for fibrous materials, which is mainly composed of a water-soluble cationic resin.

A further object of the invention is to provide a treating agent useful for fibrous materials, which is mainly composed of a water-soluble cationic thermosetting resin.

A still further object of the invention is to provide processes for preparing the above-mentioned treating agents giving improved wet and dry strengths as well as other desirable properties.

Another object of this invention is to provide applications of the treating agents.

These and other objects of the invention will become apparent from the description hereinafter.

DETAILED DESCRIPTION

It has been found that the above-mentioned objects can be accomplished by the discovery that a water-soluble cationic resin obtained by subjecting an amide-containing cationic copolymer, which is obtained by copolymerizing a monomer mixture consisting of i. 30 to 97 % by mole of at least one monomer having the following formula:

$$CH_2=C-C-CONH_2 \quad \quad (1)$$
$$\phantom{CH_2=C-C-}{\overset{\displaystyle R^1}{|}}$$

wherein $R^1$ is hydrogen or methyl group, ii. 3 to 70 % by mole of at least one cationic monomer selected from the group consisting of monomers having the following formulae or their salts:

$$CH_2=C-CH_2-NR^3R^4 \quad \quad (2)$$
$$\phantom{CH_2=}{\overset{\displaystyle R^2}{|}}$$

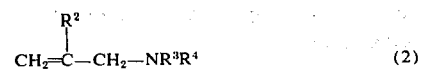

wherein $R^2$ is hydrogen or methyl group, and $R^3$ and $R^4$ are independently hydrogen, an alkyl group having 1 to 6 carbon atoms, 2-hydroxyethyl group or benzyl group;

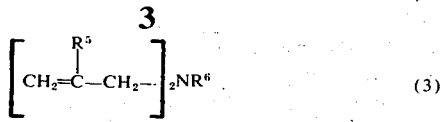 (3)

wherein $R^5$ is hydrogen or methyl group, and $R^6$ is hydrogen, an alkyl group having 1 to 6 carbon atoms, 2-hydroxyethyl group or benzyl group;

 (4)

wherein $R^7$ is hydrogen or methyl group;

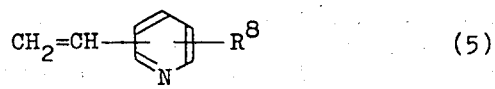 (5)

wherein $R^8$ is hydrogen or an alkyl group having 1 to 4 carbon atoms;

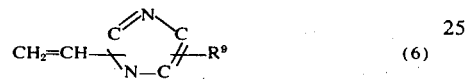 (6)

wherein $R^9$ is hydrogen or an alkyl group having 1 to 4 carbon atoms;

 (7)

wherein $R^{10}$ is hydrogen or methyl group, $R^{11}$ and $R^{12}$ are independently hydrogen, an alkyl group having 1 to 6 carbon atoms, 2-hydroxyethyl group or benzyl group, and A is ethylene group, trimethylene group, tetramethylene group or 2-hydroxytrimethylene group;

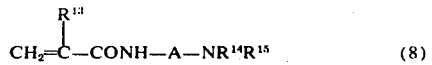 (8)

wherein $R^{13}$ is hydrogen or methyl group, $R^{14}$ and $R^{15}$ are independently hydrogen, an alkyl group having 1 to 6 carbon atoms, 2-hydroxyethyl group or benzyl group, and A is ethylene group, trimethylene group, tetramethylene group or 2-hydroxytrimethylene group;

 (9)

wherein $R^{16}$ is an alkyl group having 1 to 4 carbon atoms, $R^{17}$ and $R^{18}$ are independently hydrogen, an alkyl group having 1 to 6 carbon atoms, 2-hydroxyethyl group or benzyl group, and A is ethylene group, trimethylene group, tetramethylene group or 2-hydroxytrimethylene group, and iii. 0 to 40 % by mole of a monomer having the following formula:

 (10)

wherein $R^{19}$ is hydrogen or methyl group and X is a member selected from the group consisting of $-COOR^{20}$, $-CN$,

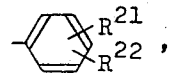,

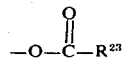

and $-CONHR^{24}$ and wherein $R^{20}$ is hydrogen, an alkyl group having 1 to 8 carbon atoms, glycidyl group or a hydroxyalkyl group having 2 to 4 carbon atoms, $R^{21}$, $R^{22}$ and $R^{23}$ are independently hydrogen, methyl group or ethyl group and $R^{24}$ is a hydroxyalkyl group having 1 to 2 carbon atoms or

to deammonification condensation with polyalkyleneimine, or a water-soluble cationic thermosetting resin obtained by reacting the amide-containing cationic copolymer, the polyalkyleneimine and a halohydrin, has an excellent effects on treating paper and fiber.

The water-soluble cationic resin or water-soluble cationic thermosetting resin of the present invention is more excellent fixing agent than that disclosed in our copending application, U.S. Patent Application Ser. No. 555,039, because of the high expansibility of the molecule thereof in aqueous medium.

According to the present invention, such water-soluble cationic resins can be effectively employed as a treating agent for fibrous materials such as paper and fiber and also the obtained aqueous solution of reaction product can be effectively employed as a treating agent for paper and fiber by itself. The treating agent of the invention has the following advantageous properties.

The treating agent of the invention is excellent in a retention ability to fiber and thus does not require a retention aid such as aluminum sulfate, and also is usable in a wide pH range, for instance, in the range of pH 3 to 10.

In paper making process, the treating agent of the invention has excellent drainage property in sheet forming and remarkably improves the retention of basic fillers such as calcium carbonate, not to mention usual fillers such as clay, talc, kaolin and titanium oxide. Further, the treating agent of the invention improves sizing degree of formed paper, wet and dry strengths of formed paper and ply-adhesion of paperboard. The treating agent of the invention is very stable for a long period of time in a form of solid or aqueous solution and does not show any quality change, and thus superior in storage stability. In addition, the treating agent does not show any trouble in sheet forming such as foaming or contamination on blanket and wire.

The water-soluble cationic resin of the invention is generally prepared by reacting an amide-containing cationic copolymer with polyalkyleneimine in an aqueous medium at pH 6 to 10, preferably at pH 7 to 9, at a temperature of 20° to 100°C., preferably 60° to 90°C., for 30 minutes to 10 hours to give a condensate. The higher the pH and also the higher the temperature, the more smoothly the above reaction proceeds. Therefore, the aqueous solution of condensate stable in acidic pH range can be obtained by cooling the reaction mixture and making it acidic at a point of time when the degree of condensation reaches a desired degree, for instance, at a point of time when the viscosity (measured by Brookfield viscometer) of the reaction mixture in a concentration of 10 % by weight increases to 1.5 to 10 times the original. In general, the molar ratio of total monomer units in the amide-containing cationic copolymer to amino group in polyalkyleneimine falls within the range of 95 : 5 to 10 : 90, preferably 90 : 10 to 20 : 80. However, it is more preferable to employ the amide-containing cationic copolymer and the polyalkyleneimine in a molar ratio of total monomer units to amino group of from 90 : 10 to 50 : 50 because polyalkyleneimine is expensive and the treating agent obtained by employing large quantities of polyalkyleneimine has a tendency of coloring a paper. When the ratio of the polyalkyleneimine is less than the above-mentioned range, the excellent effects that the polyalkyleneimine possesses in itself are lost. When the ratio of the polyalkyleneimine is more than the above-mentioned range, the excellent effects that the amide-containing cationic copolymer possesses in itself are lost. Also, the retention effect for fillers and wet and dry strengthening properties lower out of the above-mentioned range.

In the present invention, as the amide-containing cationic copolymer, those having a viscosity of 10 % by weight aqueous solution thereof in the range of 10 to 2,000,000 cP at 25°C., preferably 50 to 2000,000 cP at 25°C. are suitably employed. The viscosity is one measured by Brookfield viscometer. When the viscosity is more than the above range, the texture and wet and dry strengths of formed paper become poor though the drainage property and retention effect for fillers are improved. On the other hand, when the viscosity is less than the above range, the wet and dry strengthening properties, drainage property and retention effect for fillers are insufficient.

The amide-containing cationic copolymer employed in the present invention is prepared by copolymerizing a monomer mixture consisting of 30 to 97 % by mole, preferably 50 to 95 % by mole of acrylamine and/or methacrylamide, 3 to 70 % by mole, preferably 5 to 50 % by mole of at least one cationic monomer and 0 to 40 % by mole of vinyl monomer copolymerizable therewith. When the amount of the cationic monomer employed is less than 3 % by mole, the condensation product of the obtained copolymer and polyalkyleneimine shows a poor expansibility in water, aand the retention effect for filler and the dry strengthening properties thereof lower. The copolymerization is carried out according to a conventional polymerization process such as solution polymerization or emulsion polymerization in an aqueous medium at a pH range of 1 to 12, preferably 3 to 8.

The cationic monomers employed in the present invention are those having general formula (2) such as allylamine and derivatives thereof, for instance, N-methylallylamine, N-ethylallylamine, N-n-propylallylamine, N-isopropylallylamine, N-n-butylallylamine, N-n-amylallylamine, N-2-hydroxyethylallylamine, N-cyclohexylallylamine, N-benzylallylamine, N,N-dimethylallylamine, N,N-diethylallylamine, N-methyl-N-ethylallylamine, N-methyl-N-n-butylallylamine, N-methyl-N-benzylallylamine and N-ethyl-N-(2-hydroxyethyl)allylamine, and methallylamine derivatives corresponding to those allylamine derivatives; those having the general formula (3) such as diallylamine and derivatives thereof, for instance, N-methyldiallylamine, N-ethyldiallylamine, N-n-propyldiallylamine, N-isopropylallylamine, N-n-butylallylamine, N-n-amylallylamine, N-2-hydroxydiallylamine, N-cyclohexyldiallylamine, N-cyclohexyldiallylamine and N-benzyldiallylamine, and dimethallylamine derivatives corresponding to those diallylamine derivatives; those having the general formula (4) such as triallylamine and trimethallylamine; those having the general formula (5) such as vinylpyridines and derivatives thereof, for instance, 2-vinylpyridine, 4-vinylpyridine, 2-methyl-5-vinylpyridine, 4-methyl-5-vinylpyridine, 2-methyl-4-vinylpyridine, 2-methyl-6-vinylpyridine and 5-ethyl-2-vinylpyridine; those having the general formula (6) such as vinylimidazoles and derivatives thereof, for instance, N-vinylimidazole, N-methyl-4-vinylimidazole and 2-methyl-N-vinylimidazole; those having the general formula (7) such as aminoalkyl acrylates and derivatives thereof, for instance, 2-aminoethyl acrylate, 2-methylaminoethyl acrylate, 2-dimethylaminoethyl acrylate, 2-methylethylaminoethyl acrylate, 2-methylpropylaminoethyl acrylate, 2-methylbutylaminoethyl acrylate, 2-methylpentylamonoethyl acrylate, 2-methylhexylaminoethyl acrylate, 2-diethylaminoethyl acrylate, 2-methylcyclohexylaminoethyl acrylate, 2-methylbenzylaminoethyl acrylate, 3-dimethylaminopropyl acrylate, 3-aminoethyl acrylate, 2-dimethylaminopropyl acrylate, 2-dimethylaminobutyl acrylate, 3-dimethylaminobutyl acrylate, 4-aminoethyl acrylate, 4-dimethylaminobutyl acrylate, 3-amino-2-hydroxypropyl acrylate, 3-methylamino-2-hydroxypropyl acrylate and 3-dimethylamino-2-hydroxypropyl acrylate, and methacrylate derivatives corresponding to those acrylate derivatives; those having the general formula (8) such as N-aminoalkylacrylamides and derivatives thereof, for instance, N-(3-dimethylamino)-propylacrylamide, N-(2-dimethylamino)-ethylacrylamide, N-(2-diethylamino)ethylacrylamide and N-(3-diethylamino)propylacrylamide, and methacrylamide derivatives corresponding to those acrylamide derivatives; those having the general formula (9) such as N-vinyl-N-aminoalkylacetamides and derivatives thereof, for instance, N-vinyl-N-(3-dimethylaminopropyl)acetamide, N-vinyl-N-(3-diethylaminopropyl)acetamide, N-vinyl-N-(2-di-n-butylaminoethyl)acetamide and N-vinyl-N-(3-methylaminopropyl)-acetamide.

Such cationic monomers may be employed as acid addition salts thereof. Examples of the acid employed include hydrochloride acid, sulfuric acid, nitric acid, phosphoric acid, formic acid, acetic acid, oxalic acid and tartaric acid.

The cationic monomers employed in the present invention include quaternary ammonium salts of the cationic monomers having a tertiary amino group among the above-mentioned cationic monomers. The quaternary ammonium salts can be prepared by alkylating the corresponding cationic monomer with an alkylating agent such as methyl chloride, ethyl chloride, benzyl chloride, allyl chloride, methyl bromide, ethyl bromide, benzyl bromide, allyl bromide, methyl iodide, ethyl iodide, benzyl iodide, allyl iodide, dimethyl sulfate, dimethyl sulfite, dimethyl phosphate, ethylene oxide, propylene oxide, butylene oxide and styrene oxide. Examples of the anions of the quaternary ammonium salts include $F^-$, $Cl^-$, $Br^-$, $I^-$, $HSO_4^-$, $CH_3SO_4^-$, $HSO_3^-$, $CH_3SO_3^-$, $NO_3^-$, $NO_2^-$, $(CH_3)_2PO_4^-$, $HCOO^-$, $CH_3COO^-$ and $H(COO)_2^-$.

The vinyl monomers to be copolymerized with the cationic monomer and acrylamide and/or methylacrylamide are nonionic or anionic vinyl monomers having the general formula (10). Preferably, the nonionic vinyl monomers are employed. Examples of the nonionic vinyl monomer are those having the general formula of

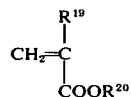

wherein $R^{19}$ is hydrogen or methyl group and $R^{20}$ is an alkyl group having 1 to 8 carbon atoms, glycidyl group or a hydroxyalkyl group having 2 to 4 carbon atoms, such as methyl acrylate, ethyl acrylate, butyl acrylate, methyl methacrylate, 2-ethylhexyl methacrylate, glycidyl methacrylate or hydroxyethyl methacrylate, those having the general formula:

wherein $R^{19}$ is as defined above, such as acrylonitrile or methacrylonitrile, those having the general formula:

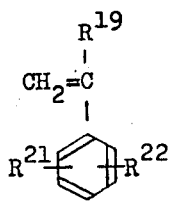

wherein $R^{19}$ is as defined above and $R^{21}$ and $R^{22}$ are hydrogen, methyl group or ethyl group, such as styrene, vinyltoluene, vinylxylene or α-methylstyrene, those having the general formula:

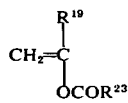

wherein $R^{19}$ is as defined above and $R^{23}$ is hydrogen, methyl group or ethyl group, such as vinyl acetate or vinyl propionate, and those having the general formula:

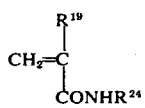

wherein $R^{19}$ is as defined above and $R^{24}$ is a hydroxyalkyl group having 1 to 2 carbon atoms or $$(CH_3)_2CCH_2COCH_3,$$

such as N-methylolacrylamide or diacetoneacrylamide. The polymerization ratio of these nonionic vinyl monomers is preferable within the range that the flocculating and water-soluble properties of the amide-containing cationic copolymer are not inhibited. Further, as the vinyl monomer employed in the present invention, there may also be employed an anionic vinyl monomer such as acrylic acid or methacrylic acid, which is copolymerized within the range that the obtained condensate of the amide-containing cationic copolymer and polyalkyleneimine is substantially cationic, usually at a molar ratio of not more than 50 %, preferably not more than 30 % based on the employed cationic monomer.

In the present invention, the amide-containing cationic copolymer must be water-soluble. In case of employing a water-insoluble cationic monomer, the obtained copolymer is liable to have a poor water solubility. In that case, the cationic monomer is neutralized with 80 to 100 % by mole or more of an acid to the cationic monomer and thereby the pH value of the copolymerization system usually falls within the range of 3 to 8 to give a water-soluble copolymer. As the acid, those employed for preparing acid addition salt of the cationic monomer as described previously are usually employed. In case the cationic monomer employed is water-soluble but the obtained copolymer is water-insoluble, it may be adopted either that the copolymerization system is adjusted to a pH of 3 to 8 or that the obtained copolymer is made into an acid addition salt.

As the polyalkyleneimine, both of straight chain and branched chain polymers are employed, and those having a degree of polymerization of not less than 20, preferably not less than 100 are suitably employed. Examples of the polyalkyleneimine employed in the present invention are polyethyleneimine and polypropyleneimine. When the degree of polymerization is less than 20, the flocculating property of the obtained condensate becomes poor, and in addition to the inferiority in the drainage property and retention effect for fillers, the wet and dry strengthening properties lower. Also, even if the polyalkyleneimine having a degree of polymerization of more than 5,000 is employed, no advantage which results from that the degree of polymerization is especially high is obtained and, therefore, the polyalkyleneimine having a degree of polymerization of 100 to 5,000 is usually employed.

In the deammonification condensation, it suffices to give the water-soluble cationic resin effective as the treating agent that at least one amide group in the amide-containing cationic copolymer combines with at least one amino group in the polyalkyleneimine, and this condensation often occurs among many polymer chains with each other. As a result of the deammonification condensation between the amide group in the amide-containing cationic copolymer and the amino group in the polyalkyleneimine, the polyalkyleneimine grafts onto the amide-containing cationic copolymer through amide bonding and the more intensive cationic condensate is obtained. Even if the non-reacted amide-containing cationic copolymer or polyalkyleneimine remains in the so obtained aqueous solution of water-soluble cationic resin, the amide-containing cationic copolymer or the polyalkyleneimine per se is effective as a strength agent and the present invention is not inhibited thereby.

In the course of the condensation reaction, when the reaction mixture, for instance, the reaction mixture of acrylamide-diethylaminoethyl methacrylate copolymer (90 : 10 by mole) and polyethyleneimine is added to methanol, it separates to a material soluble in methanol and a material insoluble in methanol. On further proceeding the reaction, when the reaction mixture is added to methanol, a material soluble in methanol decreases. With the passage of reaction time and with the increase of the viscosity of the reaction mixture, the material soluble in methanol decreases in order, and at last it is quite gone. From the fact that the acrylamide-diethylaminoethyl methacrylate copolymer is insoluble in methanol and polyethyleneimine is soluble in methanol, it is clear that polyethyleneimine chemically combines with the copolymer.

According to the present invention, a part or all of the amino groups in the so-obtained condensate of the amide-containing cationic copolymer and the polyalkyleneimine may be alkylated to increase the stability of the condensate in an aqueous medium by a conventional means using an alkylating agent such as methyl chloride, ethyl chloride, benzyl chloride, allyl chloride, methyl bromide, ethyl bromide, benzyl bromide, allyl bromide, methyl iodide, ethyl iodide, benzyl iodide, allyl iodide, dimethyl sulfate, dimethyl sulfite, dimethyl phosphate, ethylene oxide, propylene oxide, butylene oxide or styrene oxide.

The addition of the halohydrin to the condensate or the partially alkylated condensate gives the water-soluble cationic thermosetting resin, and such a water-soluble cationic thermosetting resin is also effective as the treating agent.

The thermosetting resin can be prepared by any of the following three processes.

1 Amide-containing cationic copolymer, polyalkyleneimine and halohydrin are simultaneously subjected to addition and condensation reactions in an aqueous medium in a concentration of the total reaction materials of 5 to 30 % by weight, preferably 10 to 20 % by weight at pH 6 to 10, preferably pH 7 to 9 at a temperature of 20° to 100°C., preferably 60° to 90°C.

2 Amide-containing cationic copolymer and polyalkyleneimine are subjected to the deammonification condensation in an aqueous medium in a concentration of the total reaction materials of 5 to 30 % by weight at pH 6 to 10, preferably pH 7 to 9 at a temperature of 20° to 100°C., preferably 60° to 90°C., and then the resulting condensate and halohydrin are subjected to addition reaction in an aqueous medium in a concentration of the total reaction materials of 5 to 30 % by weight at pH 4 to 10, preferably pH 6 to 8 at a temperature of 20° to 100°C., preferably 30° to 70°C.

3 Polyalkyleneimine and halohydrin are subjected to addition reaction in an aqueous medium in a concentration of the total reaction materials of 5 to 30 % by weight at pH 4 to 10, preferably pH 6 to 8 at a temperature of 20° to 100°C., preferably 30° to 70°C., and then the resulting adduct and amide-containing cationic copolymer are subjected to deammonification condensation in an aqueous medium in a concentration of 5 to 30 % by weight at pH 6 to 10, preferably pH 7 to 9 at a temperature of 20° to 100°C., preferably 60° to 90°C. The addition reaction of halohydrin to the amino groups in the polyalkyleneimine and the amide-containing cationic copolymer is usually carried out for 10 minutes to 5 hours. In the above processes (1) and (3), the conditions of the addition reaction are determined in consideration of the conditions of the deammonification condensation, because the condensation is carried out at the same time as the addition reaction or after the addition reaction. By the reason of easiness of controlling the reaction, the above process (1) or (2), preferably the process (2) is suitably employed.

The halohydrin adds to the amino groups of polyalkyleneimine and the amide-containing cationic copolymer by any of the above processes, and the thermoreactive, functional group can be introduced to the end product. This thermoreactive, functional group reacts with hydroxyl group and carboxyl group of pulp and further improves wet and dry strengths of formed paper.

In general, satisfactory results are obtained by employing 0.5 to 3 moles of the halohydrin, preferably 1.0 to 2.5 moles of the halohydrin per mole of amino group present in the reaction system. When the ratio of the halohydrin to the amino group is less than the above range, the thermosetting property is insufficient. On the other hand, when the ratio is more than the above range, the reaction mixture tends to gel during the reaction or on storage of the product.

Examples of the halohydrin employed in the present invention are epichlorohydrin, epibromohydrin, monochlorohydrin, monobromohydrin, dichlorohydrin and dibromohydrin. Epichlorohydrin and epibromohydrin are preferably employed in the invention.

According to the present invention, the obtained aqueous solution of the condensate, the alkylated condensate or the thermosetting resin is adjusted to pH 3 to 6 by an acid, for instance, inorganic acids such as hydrochloric acid, sulfuric acid or phosphoric acid and organic acids such as formic acid, acetic acid or oxalic acid, to give the treating agent stable for a long period of time. The thermosetting resin is reactive and, therefore, the storage stability is inferior to some extent to the condensate. The storage stability may be improved by optionally adding to the solution a stabilizer, for instance, salts of an organic acid such as formic acid or acetic acid or an inorganic acid such as hydrochloric acid, sulfuric acid or phosphoric acid with sodium, potassium or ammonia, and salts of hydrochloric acid with magnesium, calcium, iron, chromium or aluminum.

In case of recovering the water-soluble cationic resin in a form of solid, the obtained solution is added to a lower alkyl alcohol such as methanol, ethanol, propanol, or isopropanol to precipitate the resin because the resin is insoluble in these solvents, and thereafter the precipitated resin is filtered and washed with the above alcohol. The solid resin so obtained is also very stable, readily dissolved in water and useful for use as the treating agent.

The treating agent of the present invention has excellent properties as mentioned before and can give satisfactory effects. The treating agent of the invention is especially useful in paper making.

The treating agent of the invention may also be employed in combination with another treating agents. For instance, use of the treating agent of the invention in combination with partially hydrolyzed polyacrylamide can give more excellent results.

The treating agent of the invention may be employed in combination with a retention aid such as aluminum sulfate.

The treating agent of the invention is applied by various means, for instance, incorporation to a slurry of fiber in paper making, spraying to a wet paper, coating onto surfaces of paper or dipping of paper thereto. When employed as a wet end additive in paper making, the treating agent of the invention is usually added to a slurry of fiber in an amount of 0.05 to 10 % by weight to the fiber at pH 3 to 10. In general, the concentration of the slurry is within the range of 0.3 to 4 % by weight. In case the fiber is pulp, the treating agent is preferably added in an amount of 0.05 to 3 % by weight to the fiber, and in case the fiber is rock wool, the treating agent is added in an amount of 0.5 to 10 % by weight to the fiber. In paper making, if desired, a filler may also be added to the slurry in an amount of 5 to 30 % by weight to the fiber. In case the fiber is pulp, the filler such as clay, talc, kaoline, calcium carbonate, titanium oxide or asbestos is usually employed. The use of the treating agent of the invention in paper making can improve the retention of fillers.

In addition to the use for paper making, the treating agent of the invention is applicable as a dry and wet strength agent or an adhesive aid for various fibers, for instance, vegetable fibers such as wood pulp, bagasse pulp, bamboo pulp or straw pulp, mineral fibers such as rock wool, asbestos or glass wool and synthetic fibers, and for sheets, non-woven fabrics and fiberboards made from the above fibers. The treating agent is also applicable as an adhesive or a coating material for the fibers, sheets, non-woven fabrics and fiberboards as mentioned above by means of incorporation, coating, spraing or dipping.

The treating agent of the invention is also applicable as a flocculant, for instant, as a flocculant for treating a waste water including suspended matters.

The present invention is more specifically described and explained by means of the following Examples, in which all percents are percent by weight. These Examples are preferred embodiments of the invention and are not to be construed as limitations thereof. The following Reference Examples are one instance showing the preparation of the amide-containing cationic copolymer employed in the invention.

REFERENCE EXAMPLE 1

A one liter four necked flask equipped with a reflux condenser, a stirrer, a thermometer and a supply pipe for nitrogen gas was charged with 63.9 g. of acrylamide, 18.6 g. of diethylaminoethyl methacrylate, 3.7 g. of allyl alcohol, 10.4 g. of 35 % hydrochloric acid and 646.4 g. of deionized water. The temperature was elevated to 60°C. while supplying nitrogen gas, and then 0.82 g. of potassium persulfate dissolved in 81.2 g. of deionized water was added to the flask. The temperature was further elevated to 80°C., and at this temperature the polymerization was carried out for 3 hours. After the conclusion of the polymerization, the reaction mixture was cooled to give an aqueous solution of acrylamide-diethylaminoethyl methacrylate copolymer. The concentration, pH value and viscosity at 25°C. of the solution were 10.1 %, 6.0 and 3,700 cP, respectively.

REFERENCE EXAMPLE 2

The procedure described in Reference Example 1 was repeated except that 49.7 g. of acrylamide, 55.8 g. of diethylaminoethyl methacrylate and 31.3 g. of 35 % hydrochloric acid wre employed to give an aqueous solution of acrylamide-diethylaminoethyl methacrylate copolymer having a concentration of 9.9 %, a pH value of 4.6 and a viscosity of 4,500 cP at 25°C.

EXAMPLE 1

The procedure described in Reference Example 1 was repeated to give an aqueous solution of acrylamidediethylaminoethyl methacrylate copolymer. To the solution was added 122.7 g. of 10 % aqueous solution of polyethyleneimine having a degree of polymerization of 1,000. The molar ratio of the acrylamide unit in the copolymer to the ethyleneimine unit in the polyethyleneimine was 70 : 30. After adjusting the mixture to pH 7.0 with hydrochloric acid, the reaction was carried out at 80°C. for 2 hours. After the conclusion of the reaction, 16.1 g. of ammonium chloride was added to the reaction mixture and the resultant was divided into two equal parts. The one part was adjusted to pH 4.5 with hydrochloric acid to give an aqueous solution of water-soluble cationic resin having a concentration of 10.0 % and a viscosity of 5,200 cP at 20°C.

EXAMPLE 2 to the other part of the aqueous solution of the condensate of acrylamide-diethylaminoethyl copolymer and polyethyleneimine obtained in Example 1 was added 35.6 g. of epichlorohydrin. The molar ratio of epichlorohydrin to the amino group present in the reaction mixture was 2 : 1. The reaction was carried out at pH 7.0 at 50°C. for 2 hours. After the conclusion of the reaction, the reaction mixture was diluted with water and adjusted to pH 4.5 with hydrochloric acid to give an aqueous solution of water-soluble cationic thermosetting resin having a concentration of 8.4 % and a viscosity of 105 cP at 25°C.

COMPARATIVE EXAMPLE 1

A one liter three necked flask equipped with a reflux condenser, a stirrer and a thermometer was charged with 497 g. of 10 % aqueous solution of polyacrylamide having a viscosity of 5,200 cP at 25°C. and 64.5 g. of 20 % aqueous solution of polyethyleneimine having a degree of polymerization of 1,000. The molar ratio of the acrylamide unit to the ethyleneimine unit was 70 : 30. After adjusting the mixture to pH 7.0 with hydrochloric acid, the temperature was elevated at 80°C., and at this temperature the reaction was carried out for 2 hours. After the conclusion of the reaction, the reaction mixture was cooled, and thereto 16.1 g. of ammonium chloride was then added. The resultant was divided into two parts. The one part was adjusted to pH 5.0 with hydrochloric acid to give an aqueous solution of polyacrylamide-polyethyleneimine condensate having a concentration of 10.2 % and a viscosity of 6,000 cP at 25°C.

COMPARATIVE EXAMPLE 2

To 313 g. of the aqueous solution of polyacrylamide-polyethyleneimine condensate obtained in Comparative Example 1 was added 27.8 g. of epichlorohydrin. The molar ratio of epichlorohydrin to the amino group in the condensate was 2 : 1. The reaction was carried out at pH 7.0 at 50°C. for 2 hours. After the conclusion of the reaction, the reaction mixture was diluted with water and adjusted to pH 5.3 with hydrochloric acid to give an aqueous resinous solution having a concentration of 10.4 % and a viscosity of 2,000 cP at 25°C.

COMPARATIVE EXAMPLE 3

The procedure described in Reference Example 2 was repeated to give an aqueous solution of acrylamidediethylaminoethyl methacrylate copolymer. To the solution was added 55.5 g. of epichlorohydrin. The molar ratio of epichlorohydrin to the amino group in the copolymer was 2 : 1. The reaction was carried out at 50°C. for 2 hours. After the conclusion of the reaction, the reaction mixture was diluted with water and adjusted to pH 5.2 with hydrochloric acid to give an aqueous resious solution having a concentration of 5.0 % and a viscosity of 1,800 cP at 25°C.

COMPARATIVE EXAMPLE 4

A one liter three necked flask equipped with a reflux condenser, a stirrer and a thermometer was charged with 568 g. of 10 % aqueous solution of polyacrylamide having a viscosity of 5,200 cP at 25°C. and 60 g. of 20 % aqueous solution of ethylenediamine. The molar ratio of amide group to ethylenediamine was 80 : 20. The reaction was carried out at a temperature of 80°C. for 2 hours and further carried out at a temperature of 95°C. for 1 hour. After cooling to 50°C., 36.9 g. of epichlorohydrin was added to the reaction mixture and the reaction was further carried out at a temperature of 50°C. for 2 hours. The molar ratio of epichlorohydrin to ethylenediamine employed was about 2 : 1. After the conclusion of the reaction, the reaction mixture was diluted with water and adjusted to pH 5.1 to give an aqueous resinous solution having a concentration of 9.0 % and a viscosity of 4,200 cP at 25°C.

COMPARATIVE EXAMPLE 5

To 484 g. of 10 % aqueous solution of acrylamidedimethylaminoethyl methacrylate copolymer (70 : 30 by mole) having a pH of 7.1 and a viscosity of 9,000 cP at 25°C. was added to 27.8 g. of epichlorohydrin and the reaction was carried out at pH 7 at 50°C. for 2 hours. After the conclusion of the reaction, the reaction mixture was diluted with water and adjusted to pH 4.0 with hydrochloric acid to give an aqueous resinous solution having a concentration of 10.3 % and a viscosity of 1,800 cP at 25°C.

COMPARATIVE EXAMPLE 6

To 529 g. of 10 % aqueous solution of acrylamide-3-dimethylamino-2-hydroxypropyl methacrylate copolymer (70 : 30 by mole) having a pH of 7.0 and a viscosity of 3,000 cP at 25°C. was added 27.8 g. of epichlorohydrin and the reaction was carried out at pH 7.0 at 50°C. for 2 hours. Hereinafter, the procedure of Comparative Example 5 was repeated to give an aqueous resinous solution having a pH of 3.95, a concentration of 10.5 % and a viscosity of 760 cP at 25°C.

COMPARATIVE EXAMPLE 7

To 392 g. of 10 % aqueous solution of acrylamidediallylamine copolymer (72 : 28 by mole) having a pH of 7.3 and a viscosity of 2,000 at 25°C. was added 25.5 g. of epichlorohydrin and the reaction was carried out at pH 7.0 at 50°C. for 2 hours. Hereinafter, the procedure of Comparative Example 5 was repeated to give an aqueous resinous solution having a pH of 4.2, a concentration of 10.2 % and a viscosity of 500 cP at 25°C.

COMPARATIVE EXAMPLE 8

To 325 g. of 10 % aqueous solution of acrylamideallylamine copolymer (56 : 44 by mole) having a pH of 7.5 and a viscosity of 5,000 cP at 25°C. was added 40.7 g. of epichlorohydrin and the reaction was carried out at pH 7.0 at 50°C. for 2 hours. Hereinafter, the procedure of Comparative Example 5 was repeated to given an aqueous resinous solution having a pH of 3.85, a concentration of 9.8 % and a viscosity of 1,500 cP at 25°C.

COMPARATIVE EXAMPLE 9

To 462 g. of 10 % aqueous solution of acrylamide-N-dimethylaminoethylacrylamide copolymer (70 : 30 by weight) having a pH of 7.0 and a viscosity of 8,000 cP at 25°C. was added 27.8 g. of epichlorohydrin and the reaction was carried out at pH 7.0 at 50°C. for 2 hours. Hereinafter, the procedure of Comparative Example 5 was repeated to give an aqueous resinous solution having a pH of 3.9, a concentration of 9.9 % and a viscosity of 1,700 cP at 25°C.

EXAMPLE 3

The same flask as employed in Reference Example 1 was charged with 63.9 g. of acrylamide, 15.7 g. of dimethylaminomethyl methacrylate, 3.7 g. of allyl alcohol and 657.3 g. of deionized water. The temperature was elevated to 60°C. while supplying nitrogen gas, and then 0.82 g. of potassium persulfate dissolved in 81.2 g. of deionized water was added to the flask. The temperature was further elevated to 80°C., and at this temperature the polymerization was carried out for 3 hours. The reaction mixture was diluted with water and adjusted to pH 7.3 by adding 10.4 g. of 35 % hydrochloric acid to give an aqueous solution of acrylamide-dimethylaminomethyl methacrylate copolymer (70 : 7.8 by mole) having a concentration of 10 % and a viscosity of 1,500 cP at 25°C.

To the aqueous solution of the copolymer was added 122.7 g. of 10 % aqueous solution of polyethyleneimine having a degree of polymerization of 1,000 and the resultant was subjected to reaction at pH 7.0 at 80°C. for 2 hours to give an aqueous solution of condensate having a pH of 7.3 and a viscosity of 3,000 cP at 25°C. To the aqueous solution of condensate was added 71.2 g. of epichlorohydrin and the resultant was subjected to reaction at pH 7.0 at 50°C. for 2 hours. The reaction mixture was diluted with water and adjusted to pH 4.5 with hydrochloric acid to give an aqueous solution of cationic thermosetting resin having a concentration of 8.2 % and a viscosity of 100 cP at 25°C.

EXAMPLE 4

A mixture of 736 g. of 10 % aqueous solution of acrylamide-diallylamine copolymer (72 : 8 by mole) having a pH of 7.8 and a viscosity of 3,000 cP at 25°C. which was prepared by the similar manner as Reference Example 1 and 107.5 g. of 10 % aqueous solution of polyethyleneimine having a degree of polymerization of 1,000 was subjected to reaction at pH 7.0 at 80°C. for 2 hours to give a reaction mixture having a pH of 7.1 and a viscosity of 4,000 at 25°C. To the reaction mixture was added 64.7 g. of epichlorohydrin and the resultant was subjected to reaction at pH 7.0 at 50°C. for 2 hours. The reaction mixture was diluted with water and adjusted to pH 4.5 with hydrochloric acid to give an aqueous solution of cationic thermosetting resin having a concentration of 8.5 % and a viscosity of 250 cP at 25°C.

EXAMPLE 5

A mixture of 668 g. of 10 % aqueous solution of acrylamide-allylamine copolymer (56 : 24 by mole) having a pH of 7.5 and a viscosity of 7,000 cP at 25°C. which was prepared by the similar manner as in Reference Example 1 and 107.5 g. of 10 % aqueous solution of polyethyleneimine having a degree of polymerization of 1,000 was subjected to reaction at pH 7.0 at 80°C. for 2 hours to give a reaction mixture having a pH of 7.2 and a viscosity of 10,000 at 25°C. To the reaction mixture was added 101.8 g. of epichlorohydrin and the resultant was subjected to reaction at pH 7.0 at 50°C. for 2 hours. The reaction mixture was diluted with water and adjusted to pH 4.9 with hydrochloric acid to give an aqueous solution of cationic thermosetting resin having a concentration of 11.9 % and a viscosity of 1,600 cP at 25°C.

EXAMPLE 6

A mixture of 789 g. of 10 % aqueous solution of acrylamide-diethylaminoethyl methacrylate-acrylonitrile copolymer (56 : 8 : 16 by mole) having a pH of 6.0 and a viscosity of 7,000 cP at 25°C. which was prepared by the similar manner as in Reference Example 1 and 107.5 g. of 10 % aqueous solution of polyethyleneimine having a degree of polymerization of 1,000 was subjected to reaction at pH 7.0 at 80°C. for 2 hours to give a reaction mixture having a pH of 7.1 and a viscosity of 8,000 at 25°C. To the reaction mixture was added 64.7 g. of epichlorohydrin and the resultant was subjected to reaction at pH 7.0 at 50°C. for 2 hours. The reaction mixture was diluted with water and adjusted to pH 5.0 with hydrochloric acid to give an aqueous solution of cationic thermosetting resin having a concentration of 10.5 % and a viscosity of 1,000 cP at 25°C.

EXAMPLE 7

The procedure described in Reference Example 1 was repeated except that 49.7 g. of acrylamide, 55.8 g. of dimethylaminoethyl methacrylate and 40.0 g. of 35 % sulfuric acid were employed to give an aqueous solution of acrylamide-dimethylaminoethyl methacrylate copolymer (70 : 30 by mole) having a concentration of 10 %, a pH of 7.3 and a viscosity of 3,000 cP at 25°C. To 680 g. of the solution were added 86 g. of 10 % aqueous solution of polyethyleneimine having a degree of polymerization of 1,500 and 81.4 g. of epichlorohydrin and the resultant was subjected to reaction at pH 10.0 at 80°C. for 2 hours. The reaction mixture was diluted with water and adjusted to pH 5.0 with sulfuric acid to give an aqueous solution of cationic thermosetting resin having a concentration of 10.3 % and a viscosity of 500 cP at 25°C.

EXAMPLE 8

A mixture of 680 g. of 10 % aqueous solution of acrylamide-methylbenzylaminoethyl methacrylate copolymer (90 : 10 by mole) having a pH of 6.2 and a viscosity of 125,000 cP at 25°C. which was prepared by the similar manner as in Example 7 and 95 g. of 10 % aqueous solution of polyethyleneimine having a degree of polymerization of 150 was subjected to reaction at pH 8.5 at 80°C. for 2 hours. At the conclusion of the reaction, the reaction mixture had a pH of 6.8 and a viscosity of 8,000 cP at 25°C. To the reaction mixture was added 55.5 g. of epichlorohydrin and the resultant was subjected to reaction at pH 7.0 at 50°C. for 2 hours. The reaction mixture was diluted with water and adjusted to pH 3.5 with sulfuric acid to give an aqueous solution of cationic thermosetting resin having a concentration of 10.1 % and a viscosity of 800 cP at 25°C.

EXAMPLE 9

A mixture of 643 g. of 10 % aqueous solution of acrylamide-3-dimethylamino-2-hydroxypropyl methacrylate copolymer (90 : 10 by mole) having a pH of 6.7 and a viscosity of 100 cP at 25°C. which was prepared by the similar manner as in Example 7 and 95 g. of 10 % aqueous solution of polyethyleneimine having a degree of polymerization of 1,000 was subjected to reaction at pH 8.5 at 80°C. for 2 hours to give a reaction mixture having a pH of 7.0 and a viscosity of 200 cP at 25°C. To the reaction mixture was added 55.5 g. of epichlorohydrin and the resultant was subjected to reaction at pH 7.0 at 50°C. for 2 hours. The reaction mixture was diluted with water and adjusted to pH 3.7 with sulfuric acid to give an aqueous solution of cationic thermosetting resin having a concentration of 9.3 % and a viscosity of 50 cP at 25°C.

EXAMPLE 10

A mixture of 847 g. of 10 % aqueous solution of acrylamide-3-dimethylamino-2-hydroxypropyl methacrylate copolymer (70 : 30 by mole) having a pH of 6.8 and a viscosity of 2,000 cP at 25°C. which was prepared by the similar manner as in Example 7 and 86 g. of 10 % aqueous solution of polyethyleneimine having a degree of polymerization of 1,000 was subjected to reaction at pH 9.0 at 80°C. for 2 hours to give a reaction mixture having a pH of 6.9 and a viscosity of 3,500 cP at 25°C. To the reaction mixture was added 81.4 g. of epichlorohydrin and the resultant was subjected to reaction at pH 7.0 at 50°C. for 2 hours. The reaction mixture was diluted with water and adjusted to pH 3.8 with sulfuric acid to give an aqueous solution of cationic thermosetting resin having a concentration of 10.2 % and a viscosity of 500 cP at 25°C.

EXAMPLE 11

A mixture of 847 g. of 10 % aqueous solution of acrylamide-N-benzyldiallylamine copolymer (70 : 30 by mole) having a pH of 7.2 and a viscosity of 4,500 at 25°C. which was prepared by the similar manner as in Example 7 and 86 g. of 10 % aqueous solution of polyethyleneimine having a degree of polymerization of 1,000 was subjected to reaction at pH 8.5 at 80°C. for 2 hours to give a reaction mixture having a pH of 6.8 and a viscosity of 7,000 at 25°C. To the reaction mixture was added 81.4 g. of epichlorohydrin and the resultant was subjected to reaction at pH 7.0 at 50°C. for 2 hours. The reaction mixture was diluted with water and adjusted to pH 3.9 with sulfuric acid to give an aqueous solution of cationic thermosetting resin having a concentration of 9.3 % and a viscosity of 1,100 cP at 25°C.

EXAMPLE 12

A mixture of 608 g. of 10 % aqueous solution of acrylamide-N-(dimethylaminoethyl)acrylamide copolymer (90 : 10 by mole) having a pH of 7.4 and a viscosity of 3,300 cP at 25°C. which was prepared by the similar manner as in Example 7 and 95 g. of 10 % aqueous solution of polyethyleneimine having a degree of polymerization of 1,000 was subjected to reaction at pH 8.5 at 80°C. for 2 hours to give a reaction mixture having a pH of 6.9 and a viscosity of 4,500 cP at 25°C. To the reaction mixture was added 55.5 g. of epichlorohydrin and the resultant was subjected to reaction at pH 7.0 at 50°C. for 2 hours The reaction mixture was diluted with water and adjusted to pH 3.8 with sulfuric acid to give an aqueous solution of cationic thermosetting resin having a concentration of 8.5 % and a viscosity of 850 cP at 25°C.

EXAMPLE 13

A mixture of 740 g. of 10 % aqueous solution of acrylamide-N-(dimethylaminoethyl)acrylamide copolymer (70 : 30 by mole) having a pH of 7.0 and a viscosity of 1,500 cP at 25°C. which was prepared by the similar manner as in Example 7 and 86 g. of 10 % aqueous solution of polyethyleneimine having a degree of polymerization of 1,000 was subjected to reaction at pH 8.5 at 80°C. for 2 hours to give a reaction mixture having a pH of 6.8 and a viscosity of 3,200 cP at 25°C. To the reaction mixture was added 81.4 g. of epichlorohydrin and the resultant was subjected to reaction at pH 7.0 at 50°C. for 2 hours. The reaction mixture was diluted with water and adjusted to pH 3.75 with sulfuric acid to give an aqueous solution of cationic thermosetting resin having a concentration of 8.0 % and a viscosity of 450 cP at 25°C.

EXAMPLE 14

A mixture of 660 g. of 10 % aqueous solution of acrylamide-N-n-butyldiallylamine copolymer (90 : 10 by mole) having a pH of 7.0 and a viscosity of 7,200 cP at 25°C. which was prepared by the similar manner as in Example 7 and 95 g. of 10 % aqueous solution of polyethyleneimine having a degree of polymerization of 1,000 was subjected to reaction at pH 8.5 at 80°C. for 2 hours to give a reaction mixture of a pH of 6.7 and a viscosity of 8,500 cP at 25°C. To the reaction mixture was added 55.5 g. of epichlorohydrin and the resultant was subjected to reaction at pH 7.0 at 50°C. for 2 hours The reaction mixture was diluted with water and adjusted to pH 3.65 with sulfuric acid to give an aqueous solution of cationic thermosetting resin having a concentration of 8.5 % and a viscosity of 900 cP at 25°c.

EXAMPLE 15

A mixture of 527 g. of 10 % aqueous solution of methacrylamide-di-n-butylaminoethyl methacrylate copolymer (70 : 30 by mole) having a pH of 6.3 and a viscosity of 5,400 cP at 25°C. which was prepared by the similar manner as in Example 7 and 43 g. of 10 % aqueous solution of polyethyleneimine having a degree of polymerization of 1,000 was subjected to reaction at pH 8.5 at 80°C. for 2 hours to give a reaction mixture of a pH of 6.8 and a viscosity of 6,800 cP at 25°C. To the reaction mixture was added 40.7 g. of epichlorohydrin and the resultant was subjected to reaction at pH 7.0 at 50°C. for 2 hours. The reaction mixture was diluted with water and adjusted to pH 3.5 with sulfuric acid to give an aqueous solution of cationic thermosetting resin having a concentration of 11.3 % and a viscosity of 1,400 cP at 25°C.

EXAMPLE 16

A mixture of 790 g. of 10 % aqueous solution of acrylamide-methyl methacrylate-dimethylaminoethyl acrylate copolymer (63 : 7 : 30 by mole) having a pH of 6.3 and a viscosity of 3,300 cP at 25°C. which was prepared by the similar manner as in Example 7 and 86 g. of 10 % aqueous solution of polyethyleneimine having a degree of polymerization of 1,000 was subjected to reaction at pH 8.5 at 80°C. for 2 hours to give a reaction mixture having a pH of 6.75 and a viscosity of 4,500 at 25°C. To the reaction mixture was added 81.4 g. of epichlorohydrin and the resultant was subjected to reaction at pH 7.0 at 50°C. for 2 hours. The reaction mixture was diluted with water and adjusted to pH 3.6 with sulfuric acid to give an aqueous solution of cationic thermosetting resin having a concentration of 10.5 % and a viscosity of 700 cP at 25°C.

EXAMPLE 17

A mixture of 793 g. of 10 % aqueous solution of acrylamide-styrene-dimethylaminoethyl methacrylate copolymer (63 : 7 : 30 by mole) having a pH of 6.85 and a viscosity of 2,300 cP at 25°C. which was prepared by the similar manner as in Example 7 and 86 g. of 10 % aqueous solution of polyethyleneimine having a degree of polymerization of 4,500 was subjected to reaction at pH 8.5 at 80°C. for 2 hours to give a reaction mixture having a pH of 7.0 and a viscosity of 4,000 cP at 25°C. To the reaction mixture was added 81.4 g. of epichlorohydrin and the resultant was subjected to reaction at pH 7.0 at 50°C. for 2 hours. The reaction mixture was diluted with water and adjusted to pH 4.0 with sulfuric acid to give an aqueous solution of cationic thermosetting resin having a concentration of 10.5 % and a viscosity of 650 at 25°C.

EXAMPLE 18

A mixture of 783 g. of 10 % aqueous solution of acrylamide-vinyl acetate-dimethylaminoethyl methacrylate copolymer (63 : 7 : 30 by mole) having a pH of 6.7 and a viscosity of 3,800 cP at 25°C. which was prepared by the similar manner as in Example 7 and 86 g. of 10 % aqueous solution of polyethyleneimine having a degree of polymerization of 1,000 was subjected to reaction at pH 8.0 at 80°C. for 2 hours to give a reaction mixture having a pH of 6.8 and a viscosity of 4,800 cP at 25°C. To the reaction mixture was added 81.4 g. of epichlorohydrin and the resultant was subjected to reaction at pH 7.0 at 50°C. for 2 hours. The reaction mixture was diluted with water and adjusted to pH 3.7 with sulfuric acid to give an aqueous solution of cationic thermosetting resin having a concentration of 8.8 % and a viscosity of 730 cP at 25°C.

EXAMPLE 19

The procedure described in Reference Example 1 was repeated except that 51.1 g. of acrylamide and 16.7 g. of 2-trimethylammoniumethyl methacrylate chloride were employed as monomer to give an aqueous solution of acrylamide-2-trimethylammoniumethyl methacrylate chloride copolymer (90 : 10 by mole) having a concentration of 10 %, a pH of 5.0 and a viscosity of 7,700 cP at 25°C. To 678 g. of the solution was added 86 g. of 10 % aqueous solution of polyethyleneimine having a degree of polymerization of 1,000 and the resultant was subjected to reaction at pH 8.0 at 80°C. for 2 hours to give a reaction mixture having a pH of 6.8 and a viscosity of 9,000 cP at 25°C. To the reaction mixture was added 52 g. of epichlorohydrin and the resultant was subjected to reaction at pH 7.0 at 50°C. for 2 hours The reaction mixture was diluted with water and adjusted to pH 3.5 with hydrochloric acid to give an aqueous solution of cationic thermosetting resin having a concentration of 10.1 % and a viscosity of 1,400 cP at 25°C.

EXAMPLE 20

The aqueous solutions obtained in Example 1, Comparative Example 1 and Reference Examples 1 to 2 were applied to paper making as a treating agent.

To a 1 % slurry of laubholz bleached kraft pulp beaten to Schopper-Riegler of 30° was added each aqueous solution in an amount of 0.4 % (calculated as a non-volatile material) to pulp, respectively. Employing a TAPPI standard sheet machine, handsheets having a basis weight of 60 g./m.$^2$ were formed at pH 7.0 at a temperature of 20°C. The formed sheets were wet-pressed at a pressure of 3 kg./cm.$^2$ and then dried at a temperature of 80°C. for 5 minutes. After conditioning for 24 hours at a temperature of 20°C. and a relative humidity of 65 %, the sheets were provided to tests.

The specific bursting strength of the sheets was determined in accordance with JIS P 8112 and the breaking length of the sheets was determined in accordance with JIS P 8113 and JIS P 8115.

The same procedure as above was repeated except that calcium carbonate was further added to the slurry in an amount of 30 % to pulp to form sheets. The pH value in paper making was 8.6. The specific bursting strength of the sheets was dtermined in accordance with JIS P 8112, and the retention of filler of the sheets was determined, which was calculated from the ash content.

Further, as a control, the same procedure as above was repeated except that no treating agent was employed.

The results are shown in the following Table 1.

Table 1

| Filler | | None | | | Calcium carbonate | |
|---|---|---|---|---|---|---|
| Test No. | Treating agent | Specific bursting strength | Breaking length | | Specific bursting strength | Retention of filler |
| | | | Dry | Wet | | |
| | | — | km. | km. | — | % |
| 1 | Example 1 | 3.83 | 6.00 | 0.28 | 1.89 | 71.0 |
| 2 | Comparative Example 1 | 3.48 | 5.50 | 0.28 | 1.85 | 63.1 |
| 3 | Reference Example 1 | 3.16 | 4.93 | 0.06 | 1.78 | 55.1 |
| 4 | Reference Example 2 | 2.63 | 4.14 | 0.05 | 1.43 | 61.9 |
| 5 | None | 2.68 | 4.65 | 0.05 | 2.18 | 17.6 |

EXAMPLE 21

Employing the aqueous solutions obtained in Examples 2 to 19 and Comparative Examples 2 to 9 as a treating agent, sheets were formed under the same conditions as in Example 19 except that the treating agent was employed in an amount of 0.6 % (calculated as a non-volatile material) to pulp instead of 0.4 % and the sheet was dried at 110°C. instead of 80°C.

The results of the measurements of specific bursting strength and breaking length of the formed sheets and retention of filler are shown in the following Table 2.

Table 2

| Filler | | None | | | Calcium carbonate | |
|---|---|---|---|---|---|---|
| Test No. | Treating agent | Specific bursting strength | Breaking length | | Specific bursting strength | Retention of filler |
| | | | Dry | Wet | | |
| | | — | km. | km. | — | % |
| 1 | Example 2 | 4.16 | 6.90 | 1.56 | 2.17 | 57.5 |
| 2 | Example 3 | 4.22 | 6.95 | 1.50 | 2.29 | 58.7 |
| 3 | Example 4 | 4.27 | 7.02 | 1.59 | 2.22 | 60.9 |
| 4 | Example 5 | 4.10 | 6.87 | 1.49 | 2.17 | 61.6 |
| 5 | Example 6 | 4.14 | 6.70 | 1.43 | 2.21 | 53.0 |
| 6 | Example 7 | 4.31 | 7.10 | 1.62 | 2.20 | 63.5 |
| 7 | Example 8 | 4.10 | 6.79 | 1.51 | 2.28 | 64.2 |
| 8 | Example 9 | 4.15 | 6.94 | 1.38 | 2.31 | 56.0 |
| 9 | Example 10 | 4.09 | 6.83 | 1.58 | 2.25 | 58.0 |
| 10 | Example 11 | 4.21 | 6.70 | 1.54 | 2.28 | 57.7 |
| 11 | Example 12 | 4.25 | 7.00 | 1.39 | 2.27 | 60.5 |
| 12 | Example 13 | 4.19 | 6.85 | 1.48 | 2.21 | 58.8 |
| 13 | Example 14 | 4.16 | 6.82 | 1.48 | 2.25 | 60.0 |
| 14 | Example 15 | 4.05 | 6.80 | 1.39 | 2.29 | 56.8 |
| 15 | Example 16 | 4.26 | 7.02 | 1.50 | 2.20 | 60.8 |
| 16 | Example 17 | 4.05 | 6.80 | 1.39 | 2.23 | 54.0 |
| 17 | Example 18 | 4.10 | 6.73 | 1.41 | 2.29 | 56.1 |
| 18 | Example 19 | 4.15 | 7.01 | 1.52 | 2.31 | 59.3 |
| 19 | Comparative Example 2 | 3.97 | 6.51 | 1.38 | 2.20 | 51.9 |
| 20 | Comparative Example 3 | 3.88 | 6.29 | 1.05 | 2.29 | 46.0 |
| 21 | Comparative Example 4 | 2.88 | 5.02 | 0.90 | 2.15 | 49.5 |
| 22 | Comparative Example 5 | 3.79 | 6.31 | 1.10 | 2.10 | 52.0 |
| 23 | Comparative Example 6 | 3.60 | 6.13 | 1.04 | 2.08 | 50.5 |
| 24 | Comparative Example 7 | 3.95 | 6.41 | 1.29 | 2.11 | 52.1 |
| 25 | Comparative Example 8 | 3.70 | 6.20 | 1.15 | 2.18 | 49.8 |
| 26 | Comparative Example 9 | 3.81 | 6.24 | 1.20 | 2.13 | 50.8 |
| 27 | None | 2.59 | 4.73 | 0.05 | 2.02 | 16.9 |

What we claim is:

1. A treating agent useful for fibrous materials which comprises
   A. a reaction product of (a) an amide-containing cationic copolymer having a viscosity of 10 to 2,000,000 cP at 25°C. in 10 % by weight aqueous solution thereof and (b) a polyalkyleneimine having a degree of polymerization of not less than 20, or B. a reaction product of the above ingredients (a) and (b) and (c) a halohydrin selected from the group consisting of epichlorohydrin, epibromohydrin, monochlorohydrin, monobromohydrin, dichlorohydrin and dibromohydrin; said amide-containing cationic copolymer being prepared by copolymerizing a monomer mixture consisting of
i. 30 to 97 % by mole of at least one monomer having the following formula:

 (1)

wherein $R^1$ is hydrogen or methyl group, ii. 3 to 70 % by mole of at least one cationic monomer selected from the group consisting of monomers having the following formulae or their salts:

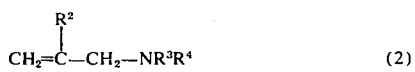 (2)

wherein $R^2$ is hydrogen or methyl group, and $R^3$ and $R^4$ are independently hydrogen, an alkyl group having 1 to 6 carbon atoms, 2-hydroxyethyl group or benzyl group;

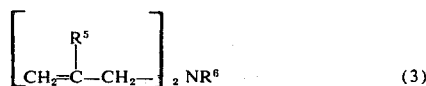 (3)

wherein $R^5$ is hydrogen or methyl group, and $R^6$ is hydrogen, an alkyl group having 1 to 6 carbon atoms, 2-hydroxyethyl group or benzyl group;

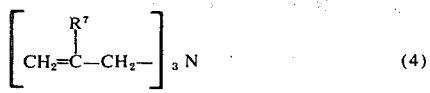 (4)

wherein $R^7$ is hydrogen or methyl group;

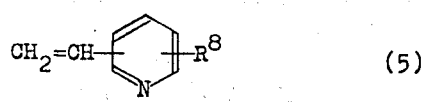 (5)

wherein $R^8$ is hydrogen or an alkyl group having 1 to 4 carbon atoms;

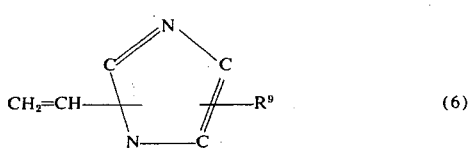 (6)

wherein $R^9$ is hydrogen or an alkyl group having 1 to 4 carbon atoms;

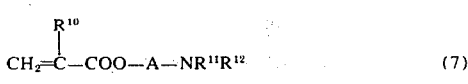 (7)

wherein $R^{10}$ is hydrogen or methyl group, $R^{11}$ and $R^{12}$ are independently hydrogen, an alkyl group having 1 to 6 carbon atoms, 2-hydroxyethyl group or benzyl group, and A is ethylene group, trimethylene group, tetramethylene group or 2-hydroxytrimethylene group;

 (8)

wherein $R^{13}$ is hydrogen or methyl group, $R^{14}$ and $R^{15}$ are independently hydrogen, an alkyl group having 1 to 6 carbon atoms, 2-hydroxyethyl group or benzyl group, and A is ethylene group, trimethylene group, tetramethylene group or 2-hydroxytrimethylene group;

 (9)

wherein $R^{16}$ is an alkyl group having 1 to 4 carbon atoms, $R^{17}$ and $R^{18}$ are independently hydrogen, an alkyl group having 1 to 6 carbon atoms, 2-hydroxyethyl group or benzyl group, and A is ethylene group, trimethylene group, tetramethylene group or 2-hydroxytrimethylene group, and iii. 0 to 40 % by mole of a monomer having the following formula:

 (10)

wherein $R^{19}$ is hydrogen or methyl group and X is a member selected from the group consisting of $-COOR^{20}$, $-CN$,

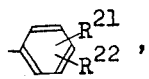,

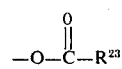

and $-CONHR^{24}$ and wherein, $R^{20}$ is hydrogen, an alkyl group having 1 to 8 carbon atoms, glycidyl group or a hydroxyalkyl group having 2 to 4 carbon atoms, $R^{21}$, $R^{22}$ and $R^{23}$ are independently hydrogen, methyl group or ethyl group and $R^{24}$ is a hydroxyalkyl group having 1 to 2 carbon atoms or

.

2. The treating agent of claim 1, wherein said amide-containing cationic copolymer has a viscosity of 50 to 200,000 cP at 25°C. in 10 % by weight aqueous solution thereof.

3. The treating agent of claim 1, wherein said amide-containing cationic copolymer is one prepared by copolymerizing a monomer mixture consisting of 50 to 95 % by mole of at least one monomer having the general formula (1), 5 to 50 % by mole of at least one cationic monomer having the general formulae (1) to (9) or their salts, and 0 to 40 % by mole of a monomer having the general formula (10).

4. The treating agent of claim 1, wherein said amide-containing cationic copolymer is one prepared by employing as the cationic monomer at least one member selected from the group consisting of monomers having the following formulae or their salts:

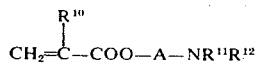

wherein $R^{10}$ is hydrogen or methyl group, $R^{11}$ and $R^{12}$ are independently hydrogen, an alkyl group having 1 to 6 carbon atoms, 2-hydroxyethyl group or benzyl group, and A is ethylene group, trimethylene group, tetramethylene group or 2-hydroxytrimethylene group;

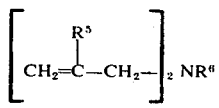

wherein $R^5$ is hydrogen or methyl group, and $R^6$ is hydrogen, an alkyl group having 1 to 6 carbon atoms, 2-hydroxyethyl group or benzyl group;

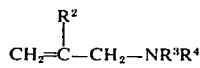

wherein $R^2$ is hydrogen or methyl group, and $R^3$ and $R^4$ are independently hydrogen, an alkyl, group having 1 to 6 carbon atoms, 2-hydroxyethyl group or benzyl group; and

wherein $R^{13}$ is hydrogen or methyl group, $R^{14}$ and $R^{15}$ are independently hydrogen, an alkyl group having 1 to 6 carbon atoms, 2-hydroxyethyl group or benzyl group, and A is ethylene group, trimethylene group, tetramethylene group or 2-hydroxytrimethylene group.

5. The treating agent of claim 1, wherein said salt of the cationic monomer is an acid addition salt or a quaternary ammonium salt.

6. The treating agent of claim 1, wherein said polyalkyleneimine has a degree of polymerization of 100 to 5,000.

7. The treating agent of claim 1, wherein said polyalkyleneimine is polyethyleneimine.

8. The treating agent of claim 1, wherein molar ratio of amide group in said amide-containing cationic copolymer to total monomer unit in said polyalkyleneimine falls within the range of 95 : 5 to 10 : 90.

9. The treating agent of claim 1, wherein molar ratio of amide group in said amide-containing cationic copolymer to total monomer unit in said polyalkyleneimine falls within the range of 90 : 10 to 20 : 80.

10. The treating agent of claim 1, wherein molar ratio of said halohydrin to amino group in said amide-containing cationic copolymer and polyalkyleneimine falls within the range of 0.5 : 1 to 3 : 1.

11. The treating agent of claim 1, wherein molar ratio of said halohydrin to amino group in said amide-containing cationic copolymer and polyalkyleneimine falls within the range of 1 : 1 to 2.5 : 1.

12. A process for preparing a treating agent which comprises subjecting an amide-containing cationic copolymer having a viscosity of 10 to 2,000,000 cP at 25°C. in 10 % by weight aqueous solution thereof and polyalkyleneimine having a degree of polymerization of not less than 20 to deammonification condensation in an aqueous medium at pH 6 to 10 at a temperature of 20° to 100°C. in a molar ratio of amide group in said amide-containing cationic copolymer to amino group in said polyalkyleneimine of from 95 : 5 to 10 : 90; said amide-containing cationic copolymer being prepared by copolymerizing a monomer mixture consisting of i. 30 to 97 % by mole of at least one monomer having the following formula:

wherein $R^1$ is hydrogen or methyl group, ii. 3 to 70 % mole of at least one cationic monomer selected from the group consisting of monomers having the following formulae or their salts:

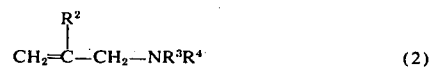

wherein $R^2$ is hydrogen or methyl group, and $R^3$ and $R^4$ are independently hydrogen, an alkyl group having 1 to 6 carbon atoms, 2-hydroxyethyl group or benzyl group;

wherein $R^5$ is hydrogen or methyl group, and $R^6$ is hydrogen, an alkyl group having 1 to 6 carbon atoms, 2-hydroxyethyl group or benzyl group;

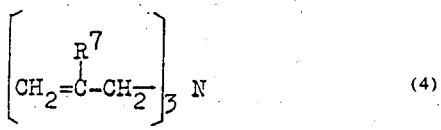

wherein $R^7$ is hydrogen or methyl group;

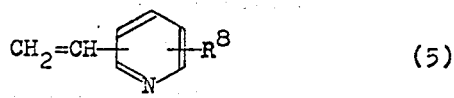

wherein $R^8$ is hydrogen or an alkyl group having 1 to 4 carbon atoms;

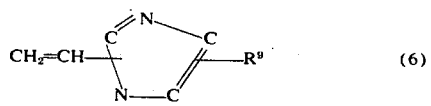

wherein $R^9$ is hydrogen or an alkyl group having 1 to 4 carbon atoms;

wherein $R^{10}$ is hydrogen or methyl group, $R^{11}$ and $R^{12}$ are independently hydrogen, an alkyl group having 1 to 6 carbon atoms, 2-hydroxyethyl group or benzyl group, and A is ethylene group, trimethylene group, tetramethylene group or 2-hydroxytrimethylene group;

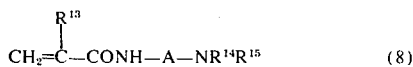 (8)

wherein $R^{13}$ is hydrogen or methyl group, $R^{14}$ and $R^{15}$ are independently hydrogen, an alkyl group having 1 to 6 carbon atoms, 2-hydroxyethyl group or benzyl group, and A is ethylene group, trimethylene group, tetramethylene group or 2-hydroxytrimethylene group;

 (9)

wherein $R^{16}$ is an alkyl group having 1 to 4 carbon atoms, $R^{17}$ and $R^{18}$ are independently hydrogen, an alkyl group having 1 to 6 carbon atoms, 2-hydroxyethyl group or benzyl group, and A is ethylene group, trimethylene group, tetramethylene group or 2-hydroxytrimethylene group, and iii. 0 to 40 % by mole of a monomer having the following formula:

 (10)

wherein $R^{19}$ is hydrogen or methyl group and X is a member selected from the group consisting of -COOR$^{20}$, -CN,

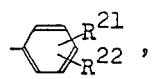

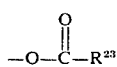

and -CONHR$^{24}$ and wherein $R^{20}$ is hydrogen, an alkyl group having 1 to 8 carbon atoms, glycidyl group or a hydroxyalkyl group having 2 to 4 carbon atoms, $R^{21}$, $R^{22}$ and $R^{23}$ are independently hydrogen, methyl group or ethyl group and $R^{24}$ is a hydroxyalkyl group having 1 to 2 carbon atoms or

13. A process for preparing a treating agent which comprises reacting an amide-containing cationic copolymer having a viscosity of 10 to 2,000,000 cP at 25°C. in 10 % by weight aqueous solution thereof, polyalkyleneimine having a degree of polymerization of not less than 20 and a halohydrin selected from the group consisting of epichlorohydrin, epibromohydrin, monochlorohydrin, monobromohydrin, dichlorohydrin and dibromohydrin in an aqueous medium at pH 6 to 10 at a temperature of 20° to 100°C. in a molar ratio of amide group in said amide-containing cationic copolymer to total monomer unit in said polyalkyleneimine of from 95 : 5 to 10 : 90 and in a molar ratio of said halohydrin to total monomer unit in said polyalkyleneimine of from 0.5 : 1 to 3 : 1,; said amide-containing cationic copolymer being prepared by copolymerizing a monomer mixture consisting of i. 30 to 97 % by mole of at least one monomer having the following formula:

 (1)

wherein $R^1$ is hydrogen or methyl group, ii. 3 to 70% by mole of at least one cationic monomer selected from the group consisting of monomers having the following formulae or their salts:

 (2)

wherein $R^2$ is hydrogen or methyl group, and $R^3$ and $R^4$ are independently hydrogen, an alkyl group having 1 to 6 carbon atoms, 2-hydroxyethyl group or benzyl group;

 (3)

wherein $R^5$ is hydrogen or methyl group, and $R^6$ is hydrogen, an alkyl group having 1 to 6 carbon atoms, 2-hydroxyethyl group or benzyl group;

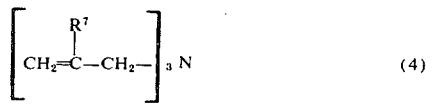 (4)

wherein $R^7$ is hydrogen or methyl group;

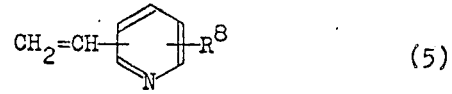 (5)

wherein $R^8$ is hydrogen or an alkyl group having 1 to 4 carbon atoms;

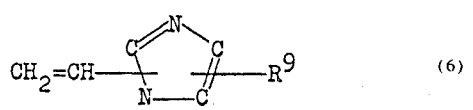 (6)

wherein $R^9$ is hydrogen or an alkyl group having 1 to 4 carbon atoms;

 (7)

wherein $R^{10}$ is hydrogen or methyl group, $R^{11}$ and $R^{12}$ are independently hydrogen, an alkyl group having 1 to 6 carbon atoms, 2-hydroxyethyl group or benzyl group, and A is ethylene group, trimethylene group, tetramethylene group or 2-hydroxytrimethylene group;

 (8)

wherein $R^{13}$ is hydrogen or methyl group, $R^{14}$ and $R^{15}$ are independently hydrogen, an alkyl group having 1 to 6 carbon atoms, 2-hydroxyethyl group or benzyl group, and A is ethylene group, trimethylene group, tetramethylene group or 2-hydroxytrimethylene group;

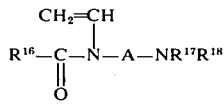 (9)

wherein $R^{16}$ is an alkyl group having 1 to 4 carbon atoms, $R^{17}$ and $R^{18}$ are independently hydrogen, an alkyl group having 1 to 6 carbon atoms, 2-hydroxyethyl group or benzyl group, and A is ethylene group, trimethylene group, tetramethylene group or 2-hydroxytrimethylene group, and iii. 0 to 40 % by mole of a monomer having the following formula:

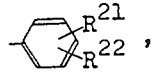 (10)

wherein $R^{19}$ is hydrogen or methyl group and X is a member selected from the group consisting of —$COOR^{20}$, —CN,

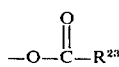

and -$CONHR^{24}$ and wherein $R^{20}$ is hydrogen, an alkyl group having 1 to 8 carbon atoms, glycidyl group or a hydroxyalkyl group having 2 to 4 carbon atoms, $R^{21}$, $R^{22}$ and $R^{23}$ are independently hydrogen, methyl group or ethyl group and $R^{24}$ is a hydroxyalkyl group having 1 to 2 carbon atoms or

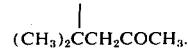

14. The process of claim 13, wherein said amide-containing cationic copolymer is reacted with said polyalkyleneimine at pH 6 to 10 at a temperature of 20° to 100°C. to form a condensate and the resulting condensate is then reacted with said halohydrin at pH 4 to 10 at a temperature of 20° to 100°C.

15. A process for preparing fibrous materials which comprises forming a sheet in an aqueous medium at pH 3 to 10 in the presence of 0.05 to 1010 by weight (calculated as a non-volatile material) of a treating agent according to claim 1 to fiber.

16. The process of claim 15, wherein said treating agent is the reaction product (A) according to claim 1.

17. The process of claim 15, wherein said treating agent is the reaction product (B) according to claim 1.

18. The process of claim 15, wherein said fiber is a vegetable fiber.

19. The process of claim 18, wherein said vegetable fiber is pulp.

20. The treating agent of claim 4, wherein said amide-containing cationic copolymer is one prepared by employing as the cationic monomer at least one member selected from the group consisting of monomers having the following formula or their salts:

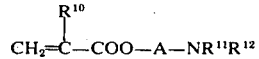

wherein $R^{10}$ is hydrogen or methyl group, $R^{11}$ and $R^{12}$ are independently hydrogen, an alkyl group having 1 to 6 carbon atoms, 2-hydroxyethyl group or benzyl group, and A is ethylene group, trimethylene group, tetramethylene group or 2-hydroxytrimethylene group.